US008205206B2

(12) United States Patent  (10) Patent No.: US 8,205,206 B2
Özer et al.  (45) Date of Patent: Jun. 19, 2012

(54) DATA PROCESSING APPARATUS AND METHOD FOR MANAGING MULTIPLE PROGRAM THREADS EXECUTED BY PROCESSING CIRCUITRY

(75) Inventors: Emre Özer, Cambridge (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 1077 days.

(21) Appl. No.: 12/149,772

(22) Filed: May 8, 2008

(65) Prior Publication Data
US 2008/0295105 A1  Nov. 27, 2008

(30) Foreign Application Priority Data

May 22, 2007  (GB) .................................. 0709819.7

(51) Int. Cl.
G06F 9/46 (2006.01)
G06F 13/00 (2006.01)
(52) U.S. Cl. ........ 718/103; 718/104; 718/105; 711/130; 711/150
(58) Field of Classification Search .................. None
See application file for complete search history.

(56) References Cited

U.S. PATENT DOCUMENTS

| | | | | |
|---|---|---|---|---|
| 4,769,761 | A * | 9/1988 | Downes et al. | 709/224 |
| 7,707,578 | B1 * | 4/2010 | Zedlewski et al. | 718/102 |
| 2004/0194094 | A1 | 9/2004 | Qiu et al. | |
| 2006/0184946 | A1 | 8/2006 | Bishop et al. | |
| 2008/0134184 | A1 * | 6/2008 | Fedorova | 718/102 |
| 2008/0134185 | A1 * | 6/2008 | Fedorova | 718/102 |
| 2008/0184233 | A1 * | 7/2008 | Norton et al. | 718/100 |
| 2008/0250415 | A1 * | 10/2008 | Illikkal et al. | 718/103 |

OTHER PUBLICATIONS

Great Britain Search Report for Great Britain Application No. 0709819.7 dated Sep. 21, 2007.
Dorai et al.: "Transparent Threads: Resource Sharing in SMT Processors for High Single-Thread Performance," Proceedings of the 2002 International Conference on Parallel Architectures and Complication Techniques, 2002, 12 Pages.
Cazorla et al.: "Predictable Performance in SMT Processors," Proceedings of the First Conference on Computing Frontiers, Apr. 2004, 11 pages.

* cited by examiner

Primary Examiner — Meng An
Assistant Examiner — Abdullah Al Kawsar
(74) Attorney, Agent, or Firm — Nixon & Vanderhye P.C.

(57) ABSTRACT

A data processing apparatus and method are provided for managing multiple program threads executed by processing circuitry. The multiple program threads include at least one high priority program thread and at least one lower priority program thread. At least one storage unit is shared between the multiple program threads and has multiple entries for storing information for reference by the processing circuitry when executing the program threads. Thread control circuitry is used to detect a condition indicating an adverse effect caused by a lower priority program thread being executed by the processing circuitry and resulting from sharing of the at least one storage unit between the multiple program threads. On detection of such a condition, the thread control circuitry issues an alert signal, and a scheduler is then responsive to the alert signal to cause execution of the lower priority program thread causing the adverse effect to be temporarily halted, for example by causing that lower priority program thread to be de-allocated and an alternative lower priority program thread allocated in its place. This has been found to provide a particularly efficient mechanism for allowing any high priority program thread to progress as much as possible, while at the same time improving the overall processor throughput by seeking to find co-operative lower priority program threads.

23 Claims, 7 Drawing Sheets

DATA PROCESSING APPARATUS AND METHOD FOR MANAGING MULTIPLE PROGRAM THREADS EXECUTED BY PROCESSING CIRCUITRY

This application claims priority to Great Britain Application No. 0709819.7 filed May 22, 2007, the entire contents of which are hereby incorporated by reference.

TECHNICAL FIELD

The technology described herein relates to a data processing apparatus and method for managing multiple program threads executed by processing circuitry, and in particular, to managing the execution of those program threads when the multiple program threads include at least one high priority program thread and at least one lower priority program thread.

BACKGROUND

Many data processing systems may include processing circuitry that is arranged to execute multiple program threads (i.e. the processing circuitry supports more than one hardware thread context). The multiple program threads may comprise separate applications, or may instead comprise different processes within an individual application that are allowed to execute in parallel. Such processing circuitry that can execute multiple program threads is often referred to as a multi-threaded processor and such multi-threaded processors can take a variety of forms. One example of such a multi-threaded processor is a simultaneous multi-threaded (SMT) processor where the processor can issue operations for multiple different threads at the same time.

It is becoming more commonplace for one or more of the program threads to be considered to be of a higher priority than other program threads. As an example, this will typically be the case in a real-time system where a high priority, real-time, program thread is required to complete operations within certain deadlines, whilst other program threads are lower priority, non-real-time, threads, which do not have any such deadlines and can progress under the shadow of the real-time program thread.

Ideally, progress of a high priority program thread should not be delayed by any lower priority program threads, but at the same time it is desirable for the lower priority program threads to be able to progress as much as they can so as to increase the overall processor throughput. However, in reality, this ideal situation is difficult to achieve because in a multi-threaded processor there are typically several resources shared between the various program threads being executed. In particular, there are typically a number of storage units that are shared between the multiple program threads and which comprise multiple entries for storing information for reference by the processing circuitry when executing those program threads. Examples of such storage units are one or more caches for storing instructions to be executed by the processing circuitry and/or data used by the processing circuitry when executing such instructions, and/or one or more translation lookaside buffers (TLBs) provided for reference by the processing circuitry when performing instruction fetch or data access operations in order to provide access control information relevant to that fetch or access operation. As yet another example of a storage unit that may be shared, branch prediction circuitry used to predict whether branch instructions are taken or not taken will typically include a number of storage structures referenced when making that prediction, for example a branch history buffer (BHB) which retains summary information about the direction a branch took the last few times it was executed, a branch target buffer (BTB) for storing target addresses of branch instructions, etc.

The sharing of such storage units introduces conflicts among different threads. For example, a cache line whose content belongs to a high priority program thread can have that content evicted from the cache by a lower priority program thread causing a linefill operation to be initiated in that cache. Clearly, such activities are not desirable for the high priority program thread, as they may delay its execution time, due to a subsequent cache miss occurring, requiring a linefill operation to be performed in order to access the required information from a lower, typically larger and slower, level of the memory hierarchy of which the cache is part.

In addition to the potential performance degradation of a high priority program thread that can result from the sharing of such storage units, the total energy consumption can also be a significant concern, and the sharing of the storage units can give rise to various energy hungry activities. For example, the energy consumption can increase if a high priority program thread or a lower priority program thread is forced to access a lower level in the memory hierarchy more frequently due to interference with the contents of a cache level higher in the memory hierarchy by another program thread executing on the processing circuitry. This for example may happen when a particular executing program thread causes eviction of instruction or data cache lines from a level one cache belonging to another program thread, or similarly causes evictions of data access information held in entries of a data or instruction TLB belonging to another executing program thread. Such evicted information will typically be placed in a lower level of the memory hierarchy, for example in a level two cache. As a level two cache is typically larger than a level one cache, more energy is consumed in accessing the level two cache when compared with the level one cache, due for example to the larger address comparisons required to determine whether a requested piece of information is currently stored in the cache.

A similar situation can arise in the branch prediction circuitry, since collisions in the branch predictor entries stored for example in the BHB or BTB structures can drop the branch prediction accuracies of all program threads. This in turn causes the processor to flush instructions from its execution pipeline when a branch misprediction occurs, which then increases the overall system energy as the required instructions then need to be re-fetched and re-executed.

Accordingly, in summary, it will be appreciated that there are a number of potentially adverse effects that can be caused by a lower priority program thread being executed by the processing circuitry, where those adverse effects result from sharing of one or more storage units between the multiple program threads executed by the processing circuitry. For example, as discussed above, the activities of the lower priority program thread may be intrusive to a high priority program thread, and hence impact the performance of the high priority program thread, or alternatively the activities of the lower priority program thread may significantly increase energy consumption within the processing circuitry.

A number of studies have been performed in respect of multi-threaded systems seeking to execute a high priority program thread and at least one lower priority program thread, and the general focus of those studies has been to improve the overall throughput and/or performance of the high priority program thread by allocating shared resources dynamically amongst the program threads. For example, the paper "Transparent Threads: Resource Sharing in SMT Processors for High Single-Thread Performance" by G Dorai et al, Proceedings of the 2002 International Conference on Parallel Architectures and Compilation Techniques, 2002, investigates a variety of resource allocation policies aimed at retaining the performance of the high priority program thread as high as possible while performing low priority operations along with the high priority operations required by the high priority program thread. The mechanisms described ensure that low priority program threads never take performance-critical resources away from the high priority program thread, whilst allocating resources to low priority program threads that do not contribute to performance of the high priority program thread. Whilst such techniques can improve the performance of the high priority program thread when executed in such a multi-threaded environment, the low priority program threads have to wait for opportunities to use the various resources that they require, and this can significantly impact the overall processor throughput.

The Article "Predictable Performance in SMT Processors" by F Cazorla et al, Proceedings of the First Conference on Computing Frontiers, April 2004, describes an SMT system in which collaboration between the operating system and the SMT hardware is used to enable the OS to enforce that a high priority program thread runs at a specific fraction of its full speed, i.e. the speed that it would run at if it was the only thread executing. There are two phases in the proposed mechanism that are executed in alternate fashion. During the first phase, referred to as the sample phase, all shared resources are given to the high priority thread, and any low priority threads are temporarily stopped. As a result, an estimate is obtained of the current full speed of the high priority thread during this phase, which is referred to as the local IPC (instructions per cycle). Then, during the second phase, referred to as the tune phase, the amount of resources given to the high priority thread is dynamically varied in order to achieve a target IPC that is given by the local IPC computed in the last sample phase multiplied by a percentage provided by the operating system to identify the fraction of the full speed at which the OS requires the high priority thread to operate. During this tune phase, the high priority program thread runs along with the low priority program threads, with resources being dynamically allocated in favour of the high priority program thread. When the target IPC is reached before the end of the interval of the tune phase, then more resources are allocated to the low priority threads.

This approach has a number of disadvantages. Firstly, it is necessary to compute the local IPC periodically, during which time none of the low priority program threads can execute. Further, the operating system scheduling mechanism needs to be modified so as to specify a desired target speed for the high priority program thread. Such an approach hence lacks flexibility, particularly in more complex systems where the number of program threads executing may vary over time.

Accordingly, it would be desirable to provide an improved technique for managing execution of multiple program threads in a multi-threaded environment so as to seek to alleviate adverse effects caused by a lower priority program thread and resulting from sharing of at least one storage unit between the multiple program threads being executed.

SUMMARY

Viewed from a first aspect, the technology described herein provides a data processing apparatus comprising: processing circuitry for executing multiple program threads including at least one high priority program thread and at least one lower priority program thread; at least one storage unit shared between the multiple program threads and comprising multiple entries for storing information for reference by the processing circuitry when executing said program threads; thread control circuitry for detecting a condition indicating an adverse effect caused by a lower priority program thread being executed by the processing circuitry and resulting from sharing of the at least one storage unit between the multiple program threads, and on detection of said condition to issue an alert signal; and a scheduler responsive to the alert signal to cause execution of the lower priority program thread causing said adverse effect to be temporarily halted.

Thread control circuitry is used to detect a condition indicating an adverse effect caused by a lower priority program thread being executing by the processing circuitry and resulting from sharing of the at least one storage unit between the multiple program threads. On detection of that condition, an alert signal is issued, and the scheduler is responsive to the alert signal to cause execution of the lower priority program thread causing the adverse effect to be temporarily halted. Accordingly, by such an approach, the operating system does not need to set any objectives for the high priority program thread, and instead the thread control circuitry seeks to reduce certain adverse effects resulting from the sharing of the at least one storage unit by advising the scheduler when a condition indicating such an adverse effect has arisen, so as to cause the lower priority program thread to be temporarily halted. Such an approach provides a simple and effective mechanism for seeking to alleviate such adverse effects, and provides a very flexible solution. For example, the basic operation of the scheduler (typically part of the operating system) does not need to be altered in order to allow the technology to be utilised, and there are a number of ways in which the problematic lower priority program thread can be caused to be temporarily halted.

In one embodiment, the scheduler maintains a record of additional lower priority program threads awaiting allocation to the processing circuitry, and temporarily halts execution of the lower priority program thread causing said adverse effect by de-allocating that lower priority program thread and allocating in its place one of the additional lower priority program threads. Hence, in such embodiments, the thread control circuitry associated with the processing circuitry detects a condition indicating the adverse effect and then issues an alert signal to the scheduler which triggers the scheduler to de-allocate that problematic lower priority program thread and in its place allocate an alternative lower priority program thread which is currently awaiting execution.

Hence, whenever the thread control circuitry detects that a particular lower priority program thread is giving rise to an adverse effect, such as for example by adversely affecting the performance of the high priority program thread through its interference with content of the high priority program thread stored in the at least one storage unit, or because the lower priority program thread is giving rise to adverse energy consumption, then the mechanism of the above described embodiment causes an alternative lower priority program thread to be scheduled in place of that offending lower priority program thread in the expectation that this newly allocated lower priority program thread may execute more co-operatively in combination with the high priority program thread. Hence, by such embodiments, the at least one high priority program thread is allowed to progress as much as possible, but at the same time the overall processor throughput is improved by seeking to schedule co-operative lower priority program threads that can shared the at least one storage unit with the high priority program thread without giving rise to such adverse effects.

In one embodiment, on de-allocating the lower priority program thread causing said adverse effect, the scheduler places that lower priority program thread in the record to allow subsequent reallocation of that lower priority program thread to the processing circuitry. Such a mechanism is also referred to herein as low priority thread recycling, because the de-allocated lower priority thread is placed back into the record, and hence can subsequently be re-allocated. This is beneficial since whilst it may previously have given rise to an adverse effect when scheduled along with the high priority program thread, that adverse effect may have only been a temporal effect, and its subsequent re-allocation at a different time may not any longer give rise to the adverse effect.

Whilst in one embodiment the scheduler temporarily halts the lower priority program thread causing the adverse effect by de-allocating it and allocating an alternative lower priority program thread in its place, in some embodiments this is not the only option available to the scheduler. For example, in one embodiment, the scheduler may be responsive to receipt of the alert signal to delay performing the de-allocation of the lower priority program thread for a period of time, during that period of time the processing circuitry stalling execution of that lower priority program thread. Hence, in such embodiments, if processing of the alert signal is delayed, for example due to a reason related to the functions currently being performed by the scheduler, the processing circuitry continues to run the at least one high priority program thread, but during this time the lower priority program thread giving rise to the adverse effect is stalled until the alert signal is processed by the scheduler. By stalling the operation of the offending lower priority program thread, it will no longer in that period whilst it is stalled cause the adverse effect, and when it is subsequently de-allocated and a different lower priority program thread allocated, it is hoped that the newly allocated lower priority program thread will not cause such adverse effects, and instead will execute more co-operatively with the at least one high priority program thread. Clearly, this process of de-allocation and re-allocation can be repeated again if the allocated lower priority program thread also gives rise to the adverse effect, until a co-operative lower priority program thread is found.

In one embodiment, if on receipt of the alert signal the scheduler determines that there are no additional lower priority program threads awaiting allocation to the processing circuitry, the scheduler is arranged not to de-allocate the lower priority program thread causing said adverse effect, and instead the processing circuitry stalls execution of that lower priority program thread for a period of time, whereafter execution of that lower priority program thread is resumed. Hence, in this embodiment, the issuance of the alert signal can be ignored by the scheduler if there are no other lower priority program threads that could be allocated in place of the offending lower priority program thread. In that scenario, the processing circuitry is arranged for a period of time (which may be fixed or programmable) to stall execution of the lower priority program thread, so that during that period it cannot cause the adverse effect, and then on expiry of that period of time execution of the lower priority program thread is resumed. It is possible that following this period of time the same lower priority program thread will not necessarily give rise again to the adverse effect since the factors giving rise to the occurrence of the adverse effect may have only been temporal in nature, for example due to a similar memory access or branch execution pattern in both the high priority program thread and the offending lower priority program thread during a certain period of time.

The adverse effect can take a variety of forms. In one embodiment, the adverse effect is an adverse impact on the performance of the at least one high priority program thread, and the condition indicating said adverse effect is an occurrence of adverse replacements in the at least one storage unit exceeding a predetermined level, an adverse replacement occurring when information associated with the at least one high priority program thread is overwritten in an entry of the at least one storage unit as a result of activities of the at least one lower priority program thread executing on said processing circuitry. Such adverse replacements may for example occur during eviction operations performed by the relevant storage unit when the lower priority program thread provides new information to be stored within that storage unit, in situations where the information evicted to make room for the new information is in fact information associated with the at least one high priority program thread. Such adverse replacements are clearly likely to have an adverse impact on the performance of the at least one high priority program thread since the high priority information that has been overwritten is likely to have to be re-retrieved again by the high priority program thread in due course, giving rise to access latency delays. Since such adverse replacements result directly from the activities of the least one lower priority program thread, it can be seen that that lower priority program thread is directly adversely affecting the performance of the at least one high priority program thread. When the occurrence of such adverse replacements exceeds a predetermined level (which may be predetermined or programmable), then the thread control circuitry issues the alert signal to the scheduler to cause the offending lower priority program thread to be temporarily halted using any of the mechanisms described earlier.

To enable the thread control circuitry to monitor occurrences of such adverse replacements, it is necessary for the thread control circuitry to receive indications when information associated with the at least one high priority program thread is overwritten in a shared storage unit by information pertaining to a lower priority program thread. In one embodiment, the data processing apparatus further comprises: an indicator provided in association with each entry of the at least one storage unit to identify whether the information stored therein is associated with the at least one high priority program thread; and a detector, responsive to information being written into an entry of the at least one storage unit as a result of activities of the at least one lower priority program thread, to reference the indicator for that entry in order to identify whether said adverse replacement is occurring, and if so to issue an adverse event signal to the thread control circuitry. Hence, in such embodiments, the thread control circuitry receives an adverse event signal upon each occurrence of an adverse replacement.

Due to the fact that several adverse event signals may be issued simultaneously by multiple of the storage units, the data processing apparatus of one embodiment further comprises a queue for temporarily buffering one or more of said adverse event signals prior to those signals being processed by the thread control circuitry.

The indicator provided in association with each entry may be specifically provided for the above purpose. However, alternatively, if the entries of the at least one storage unit are already tagged with a thread ID, process ID, or the like, then this ID can itself identify whether the information stored in a particular entry is associated with the at least one high priority program thread, and hence can be used to form the above described indicator.

In situations where there is more than one shared storage unit, it may be beneficial for the adverse event signal to identify the storage unit in which the adverse replacement took place. This for example would be useful if different weightings are to be associated with adverse replacements occurring in different storage units.

In one embodiment, the adverse effect being monitored is adverse energy consumption, and the condition indicating said adverse effect is occurrences of one or more predetermined energy hungry activities in respect of the at least one lower priority program thread executing on said processing circuitry exceeding a predetermined level, an adverse event signal being output to the thread control circuitry whenever said one or more predetermined energy hungry activities occur.

Examples of such energy hungry activities may be the lower priority program thread accessing a level two cache (which consumes significantly more energy than accesses to a level one cache), and/or branch prediction activities which give rise to mispredictions, causing flushing of instructions from the execution pipeline, and re-fetching and re-execution of instructions, all of which give rise to significant energy consumption. Hence, by way of example, one of the predetermined energy hungry activities may comprise an access to one of said at least one storage units by the at least one lower priority program thread. As a further example, one of the predetermined energy hungry activities may comprise a branch misprediction in respect of a branch instruction executed by the at least one lower priority program thread.

In one embodiment, the adverse event signal identifies the energy hungry activity. This may for example be beneficial when different weightings are applied to different types of energy hungry activity by the thread control circuitry when determining whether the predetermined level has been exceeded.

Whilst in one embodiment, the thread control circuitry may only seek to detect an adverse impact on the performance of the at least one high priority program thread, or in another embodiment may only seek to detect adverse energy consumption, in one embodiment the adverse effect can be a combination of both an adverse impact on the performance of the at least one high priority program thread and adverse energy consumption, in which event occurrences of both adverse replacements and said one or more predetermined energy hungry activities are taken into account by the thread control circuitry in determining whether the predetermined level has been exceeded. Hence, in such embodiments, intrusive and/or energy hungry lower priority program threads can be kept under control in order to maintain the steady running time of the at least one high priority program thread whilst seeking to keep the system energy below or at a certain level.

The thread control circuitry can take a variety of forms. In one embodiment, the thread control circuitry comprises: an interface for receiving adverse event signals issued when events contributing to said adverse effect occur; a counter for maintaining a cumulative count value indicative of the received adverse event signals; a threshold storage for storing a threshold value indicating a predetermined level at which said condition indicating said adverse effect is detected; and a comparator for comparing the cumulative count value with said threshold value, and for issuing said alert signal when said condition is detected. Hence, the thread control circuitry can be provided by a relatively simple piece of hardware consisting of a counter, a comparator, and a storage element for holding a threshold value.

The threshold value may in one embodiment be predetermined. However, in an alternative embodiment the threshold value is programmable, for example by the scheduler.

Whilst in one embodiment all events contributing to the adverse effect can be given the same weight by the thread control circuitry, in an alternative embodiment the data processing apparatus further comprises a weight table for associating different weighting values with different events, such that for each received event signal indicating occurrence of an event, an amount by which the cumulative counter is increased is dependent on the weighting value associated with that event in the weight table. Hence, by way of example, adverse replacements that are more likely to give rise to an adverse impact on the performance of the at least one high priority program thread can be given a higher weighting than other adverse replacements which are likely to have less of an adverse impact on performance of the at least one high priority program thread. Similarly, certain energy hungry activities of the lower priority program thread can be considered to be more serious than others, and accordingly given a higher weighting.

The various weighting values may in one embodiment be predetermined, whilst alternatively they may be programmable, for example by the scheduler.

Typically, after the alert signal has been issued to cause the scheduler to temporarily halt execution of the offending lower priority program thread, the counter is reset when a replacement lower priority program thread is allocated, or when the same lower priority program thread is restarted following a period in which it has been stalled, so that the counter then starts at an initial value, for example zero.

In one embodiment, the data processing apparatus further comprises: a timer storage which is set on issuance of said alert signal to begin counting clock cycles, and is reset on allocation of one of the additional lower priority program threads; if the timer storage counts a specified number of clock cycles without the lower priority program thread being deallocated, the counter is reset and the processing circuitry is arranged to resume execution of that lower priority program thread. Hence, this provides a mechanism whereby execution of the lower priority program thread can be resumed if no re-allocation is performed by the scheduler within a specified number of clock cycles, again the counter being reset prior to execution of that lower priority program thread being resumed.

The specified number of clock cycles for which the timer storage counts may be predetermined, or alternatively may be programmable, for example by the scheduler. In one particular embodiment, the timer storage is set on issuance of the alert signal to a value indicative of the specified number of clock cycles, and then counts down from that initial value, such that if the timer storage counts down to zero without any new lower priority program thread being allocated, the counter is reset and the processing circuitry is arranged to resume execution of the lower priority program thread that has been stalled.

In one embodiment, the processing circuitry may be arranged to execute a single high priority program thread and a single lower priority program thread at any particular point in time, and following issuance of the alert signal the currently executing lower priority program thread can be deallocated and another lower priority program thread allocated in its place. However, in an alternative embodiment said processing circuitry executes multiple lower priority program threads, each adverse event signal identifies the lower priority program thread that it is associated with, and said thread control circuitry has a separate counter for each lower priority program thread, when issuing an alert signal said thread control circuitry indicating which lower priority program thread it relates to. Hence, the thread control circuitry can separately keep track of adverse effects caused by each of the executing lower priority program threads, and when issuing an alert signal will identify which lower priority program thread that alert signal relates to, to allow the scheduler to temporarily halt execution of the appropriate lower priority program thread.

Whilst the same threshold value may be associated with all of the lower priority program threads, in one embodiment the threshold storage stores a separate threshold value for each of the multiple lower priority program threads. This provides a great deal of flexibility, since it allows a higher level of interference by some lower priority program threads to be tolerated than is tolerated for other lower priority program threads, and hence threshold values can be established having regard to the perceived importance of the various tasks performed by the various lower priority program threads.

Viewed from a second aspect, the technology described herein provides a method of managing multiple program threads executed by processing circuitry of a data processing apparatus, the multiple program threads including at least one high priority program thread and at least one lower priority program thread, and the data processing apparatus having at least one storage unit shared between the multiple program threads and comprising multiple entries for storing information for reference by the processing circuitry when executing said program threads, the method comprising the steps of: detecting a condition indicating an adverse effect caused by a lower priority program thread being executed by the processing circuitry and resulting from sharing of the at least one storage unit between the multiple program threads; on detection of said condition, issuing an alert signal; and responsive to the alert signal, employing a scheduler to temporarily halt execution of the lower priority program thread causing said adverse effect.

Viewed from a third aspect, the technology described herein provides a data processing apparatus comprising: processing means for executing multiple program threads including at least one high priority program thread and at least one lower priority program thread; at least one storage means shared between the multiple program threads and comprising multiple entry means for storing information for reference by the processing means when executing said program threads; thread control means for detecting a condition indicating an adverse effect caused by a lower priority program thread being executed by the processing means and resulting from sharing of the at least one storage means between the multiple program threads, and on detection of said condition for issuing an alert signal; and scheduler means, responsive to the alert signal, for causing execution of the lower priority program thread causing said adverse effect to be temporarily halted.

DESCRIPTION OF EXAMPLE EMBODIMENTS

Figure 1:
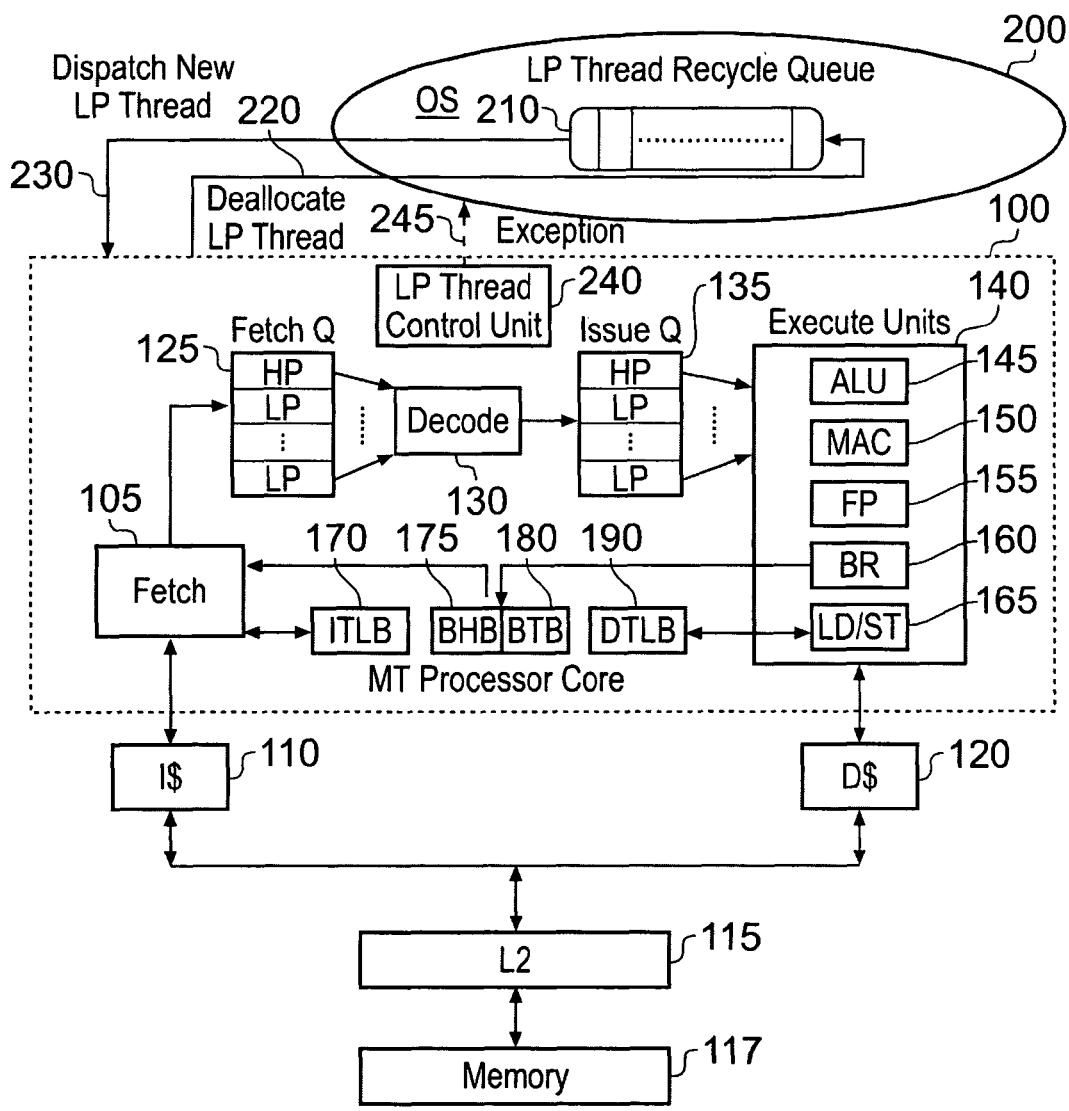
FIG. 1 is a block diagram illustrating a data processing apparatus in accordance with one example embodiment.

FIG. 1 illustrates a data processing apparatus in accordance with one example embodiment. In accordance with this embodiment, a multi-threaded (MT) processor core 100 (such as a coarse grained MT processor, fine grained MT processor, or simultaneous multi-threaded (SMT) processor) is used to execute multiple program threads. For the purposes of the following discussion, it will be assumed that the processor core 100 is an SMT processor core. In the example of FIG. 1, one of the program threads is considered to be a high priority program thread, and the remaining program threads are considered to be low priority program threads. A fetch unit 105 is used to fetch instructions from memory for the various program threads and place those instructions within the fetch queue 125, which can be considered to comprise separate queues for each program thread. Each of the instructions is decoded by the decoder 130 to produce operation control information specifying the required data processing operation to be performed, with that operation control information then being placed within the issue queue 135. The issue queue can be considered to have separate queues for each thread.

Each program thread shares the resources of the MT core. In one embodiment, if the high priority program thread has operations to be performed, they take preference over any operations to be performed in respect of the low priority program threads, and accordingly if the issue queue 135 contains operation control information relating to a high priority program thread, then that will be routed to the relevant one of the execute units 140 in preference to operation control information of a low priority program thread. However, in the absence of any operations needed in respect of the high priority thread, then operations associated with one or more of the low priority threads will be routed to the relevant one or more of the execute units 140.

As shown in FIG. 1, a number of execute units 140 will typically be provided within the SMT core. For example, an arithmetic logic unit (ALU) 145 will be used to perform arithmetic operations, and a multiply accumulate (MAC) unit will be used to perform multiply accumulate operations. A floating point (FP) unit 155 will be used to perform floating point operations, a branch unit 160 will be used to perform branch operations, and a load/store unit 165 will be used to perform load or store operations in order to load data from memory into working registers of the MT core, or to store data from such registers back to memory.

When the fetch unit 105 wishes to fetch an instruction, it will typically output the address of that instruction to the instruction cache 110, which will then perform a lookup operation in order to determine whether the instruction requested is currently stored within the cache. If it is, then the instruction will be returned to the fetch unit 105, whereas otherwise a linefill operation will be invoked, whereby the instruction cache 110 selects a victim cache line to be evicted from the cache, and issues a linefill request to the level two cache 115 in order to obtain a cache line's worth of instructions, including the instruction requested by the fetch unit. If the level two cache 115 has the required instructions, it will return them to the instruction cache 110, whereas if it does not a similar linefill operation will be invoked in order to cause a level two cache line to be evicted and a level two cache line's worth of instructions to be retrieved from memory 117 for storing in the level two cache, whereafter a level one cache line's worth of instructions will be returned to the instruction cache 110.

Similarly, if the load/store unit 165 wishes to access data, it will typically issue an access request for that data to the data cache 120, and on receipt of that access request the data cache 120 will determine whether the data being requested is present in the data cache. If so, the data will be accessed in the cache, whereas otherwise a linefill operation will be performed during which the data cache 120 will select a victim cache line for eviction, and will issue a linefill request to the level two cache 115 in order to obtain a cache line's worth of data including the data the subject of the access request from the load/store unit 165. The level two cache 115 then operates in the same manner as discussed earlier with reference to the instruction fetch process.

Whilst in FIG. 1 it is assumed that at the level one cache level a separate instruction cache 110 and separate data cache 120 are provided, it will be appreciated that there is no requirement for separate instruction and data caches at the level one level, and instead a unified level one cache could be used. Similarly, whilst the level two cache 115 is shown as a unified cache, there is no requirement for the level two cache to be a unified cache, and accordingly a level two cache could alternatively take the form of a separate instruction cache and a separate data cache.

The above mentioned instruction cache 110, data cache 120, and level 2 cache 117 are examples of storage units that are shared between the multiple program threads, and it will be appreciated that when data and/or instructions pertaining to a low priority program thread are stored in one of the caches, the eviction process used to make room for that information may cause data and/or instructions pertaining to the high priority program thread to be evicted, which can adversely affect the performance of the high priority thread. Also, the overall energy consumption may increase if activities of any particular program thread causes the data/instructions of another program thread to be evicted from the level 1 cache more often than might otherwise be the case, as this will result in increased level 2 cache access activity.

In addition to the caches, there are typically other shared storage units provided within the system. For example, an instruction TLB 170 will typically be provided in association with the fetch unit 105, and prior to issuing the fetch request for an instruction, the fetch unit 105 will reference the instruction TLB 170 in order to obtain access control information for a memory region including the address of the instruction to be fetched. This access control information is typically retrieved by the instruction TLB from a page table in memory, and in particular such page tables typically include descriptors for a number of different memory regions. If the fetch unit 105 specifies an address which does not match any of the entries currently stored in the TLB 170, then typically the relevant page table in memory will be accessed in order to retrieve the required descriptor and then store within an entry of the TLB the relevant access control information. As part of this process, a victim entry in the TLB 170 needs to be selected, and its contents are then overwritten with the above-mentioned access control information.

A data TLB 190 can be used in an identical manner to provide access control information in association with each access request to be issued by the load/store unit 165, and again victim entries are selected as and when required to make room for new access control information retrieved from descriptors in memory to be stored in the TLB.

As will be appreciated by those skilled in the art, the access control information stored in either the instruction TLB 170 or the data TLB 190 can take a variety of forms. For example, if virtual addressing is used within the MT core 100, a virtual to physical address translation can be specified as part of the access control information. Further, the access control information can include access permission rights identifying whether the specified address can be accessed by the MT core operating in its current mode of operation. For example, certain regions of memory may not be accessible by the MT core when operating in a user mode of operation. Additionally, the access control information may specify region attributes, for example specifying whether the address in question is cacheable, bufferable, etc. Only if the address is identified as being cacheable will lookup operations be performed in the relevant caches 110, 120, 115, and if the address is specified as non-cacheable, the required instruction or data value will be accessed directly in memory 117.

As with the earlier-mentioned example of the caches, it will be appreciated that the activities of the low priority program thread(s) can cause access control information referenced by the high priority program thread to be replaced in the ITLB 170 and/or DTLB 190, thereby adversely affecting the performance of the high priority program thread if that access control information subsequently needs to be re-retrieved from memory.

The fetch unit 105 will often use branch prediction circuitry for identifying branch instructions and predicting whether those branch instructions will be taken. Often a BHB 175 is used to store summary information about the direction a branch took the last few times it was executed, and this information is used to predict whether a branch will be taken or not taken. In particular the BHB comprises a plurality of entries, each entry maintaining a counter value. An index generator is used to index into a particular entry of the BHB, and various branch instructions may index into the same BHB entry. Each BHB entry is updated with the results of previous branch instructions that index to that entry, such that for each taken branch the appropriate counter is incremented, and likewise for each not-taken branch the appropriate counter is decremented. When making a prediction for a branch instruction not yet executed, the appropriate entry is reviewed and the counter value stored therein is used to predict whether the branch instruction will be taken or not taken.

If both the high priority program thread and the low priority program thread(s) execute branch instructions which cause the same entries in the BHB to be updated this can cause collision in the branch predictor which can lower the branch prediction accuracy of all threads. For example if a high priority program thread branch instruction is generally taken, there will be a tendency to increment the relevant counter in the BHB 175. If however a low priority program thread branch instruction is generally not taken, there will be a tendency to decrement the relevant counter in the BHB 175. If both of these branch instructions index to the same BHB counter, the counter value will not provide a good prediction for either branch instruction, which will result in significant increased power consumption due to the resultant mispredictions, which will require flushing of instructions from the execute units 140, and re-fetching and re-executing of the required instructions.

For a branch instruction that is predicted to be taken, the fetch unit then needs to determine the next instruction to be fetched, and in one embodiment a branch target buffer (BTB)

180 is referenced by the fetch unit 105 in order to seek to identify the target address for the branch instruction, and hence identify the next instruction to be fetched. If on accessing the BTB 180, it is determined that none of the entries in the BTB 180 provide a target address for the branch instruction in question, then the fetch unit 105 will not at that time be able to determine the target address, and accordingly will have to take some different action, for example by stopping the fetch process, fetching from sequential addresses, etc. However, when the branch instruction is subsequently executed, the branch unit 160 will determine the target address, and can provide that information to the BTB 180 for storing in the BTB. In particular the BTB will select a victim entry to become an allocated entry for that branch target information, an indication of the branch instruction and the associated target address then being stored in that victim entry. As with the earlier-mentioned examples of the caches and TLBs, it will be appreciated that the activities of the low priority program thread(s) can cause target address information for high priority program thread branch instructions to be overwritten in the BTB 180 by target address information for low priority program thread branch instructions, thereby adversely affecting the performance of the high priority program thread.

A decision as to which program threads are executed by the MT processor core 100 at any particular point in time is made by the operating system (OS) 200 running on the system, which includes a scheduler for scheduling the various program threads. It is assumed that the high priority program thread is executed all of the time, and that a subset of the lower priority program threads is also allocated to the processor core 100. In one particular embodiment, a single low priority thread may be allocated to the processor core 100 to operate alongside the high priority program thread.

The OS 200 maintains a thread recycle queue 210 providing a record of low priority program threads awaiting allocation to the processor core 100. In accordance with example embodiments, a thread control unit 240 is provided (in one embodiment this being provided within the processor core 100) which seeks to detect a condition indicating an adverse effect caused by a low priority program thread being executed by the processor core, and resulting from sharing of at least one storage unit between the high priority program thread and that low priority program thread. On detection of that condition, an alert signal is issued over path 245 to the OS 200, in one example embodiment this alert signal taking the form of an exception signal. As will be discussed in more detail later, this causes the scheduler within the OS to temporarily halt execution of the low priority program thread causing the adverse effect. In one particular embodiment this is done by de-allocating that low priority program thread, as a result of which information about that low priority program thread will be passed over path 220 for storing in the thread recycle queue 210. At the same time, a new low priority thread will be chosen from the thread recycle queue 210 for allocating to the processor core 100, and the required information about that new thread will be passed over path 230 to the processor core 100. The thread recycle queue may be arranged in a variety of ways, but in one embodiment may operate as a FIFO (first-in-first-out) queue.

The operation of the thread control unit 240 will be discussed in more detail later with reference to the remaining figures. However, as a general overview of its operation, once a low priority program thread is dispatched to the processor core 100 from the thread recycle queue 210, the processor core 100 uses the thread control unit 240 to track the behaviour of that low priority program thread during its execution with the high priority program thread. If the low priority program thread interferes with the high priority program thread excessively (by performing actions with respect to the shared storage units 110, 115, 120, 170, 175, 180, 190 that are detrimental to the high priority program thread) or the system energy goes over a certain level due to unpredicted behaviour of the low priority program thread, the thread control unit determines that this low priority program thread is, at that point, very intrusive to the performance of the high priority program thread, and/or is power hungry. At this point, the thread control unit issues an exception signal over path 245 to recommend to the OS 200 that the OS replace this current low priority program thread with another one. This mechanism is referred to herein as "low priority program thread recycling", because the de-allocated low priority program thread can be re-assigned as the designated low priority program thread at some subsequent point in time. At that time it may not produce the adverse effect that it previously did, as its previous intrusive or power hungry behaviour might have been only a temporal activity, for example due to similar memory access or branch execution patterns in both the high priority program thread and the low priority program thread for a certain period of time.

As a result of this mechanism, the high priority program thread is allowed to progress as much as possible, whilst at the same time the overall processor throughput is improved by seeking to choose co-operative low priority program threads, and also the system energy is kept under control by recycling low priority program threads if a particular low priority program thread becomes particularly power hungry.

Figure 2:
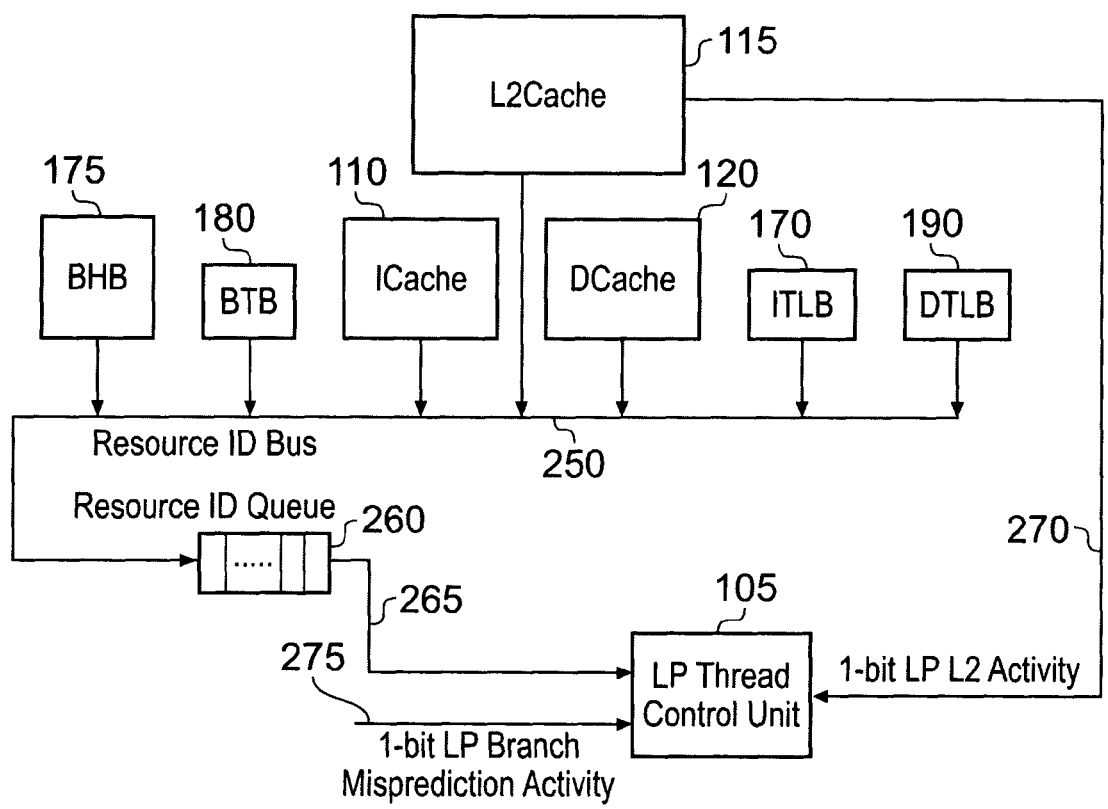
FIG. 2 illustrates the various input signals provided to the thread control unit of FIG. 1 in accordance with one example embodiment.

FIG. 2 is a diagram illustrating the various input signals received by the thread control unit 240 of FIG. 1 in accordance with one embodiment. In particular, when a low priority program thread operation overwrites or conflicts an entry in a shared storage unit whose content belongs to the high priority program thread, the shared storage unit (also referred to herein as a shared resource) in which the conflict occurred places its resource ID on the resource ID bus 250. In the example illustrated in FIG. 2, there are seven shared resources, namely the three caches 110, 115, 120, the ITLB 170 and DTLB 190, the BHB 175 and the BTB 180. Accordingly, the resource ID bus in this example may have a bus width of three bits to allow each resource to be uniquely identified.

To allow for multiple simultaneous interferences in the shared resources to be notified to the thread control unit 240, several resource IDs can be buffered in the resource ID queue 260 to be processed in series by the thread control unit 240. In the particular example of FIG. 2 where there are seven separate shared resources, then the resource ID queue 260 may have seven entries.

In addition to the input signals provided over path 265 that indicate when adverse replacements occur within the shared resources (i.e. when information pertaining to the high priority program thread is overwritten by information pertaining to the low priority program thread), the thread control unit 240 also receives other input signals indicative of energy hungry activities of the low priority program thread. For example, the thread control unit 240 may in one embodiment receive a signal over path 270 each time the low priority program thread accesses the level two cache 115, since such accesses consume significant energy. Further, the thread control unit 240 may receive a signal over path 275 every time a branch misprediction occurs in respect of branch instructions executed by the low priority program thread, since again these mispredictions give rise to significant energy consumption, due to the need to flush instructions from the execute units 140, and re-fetch and re-execute the relevant instructions.

Figure 3:
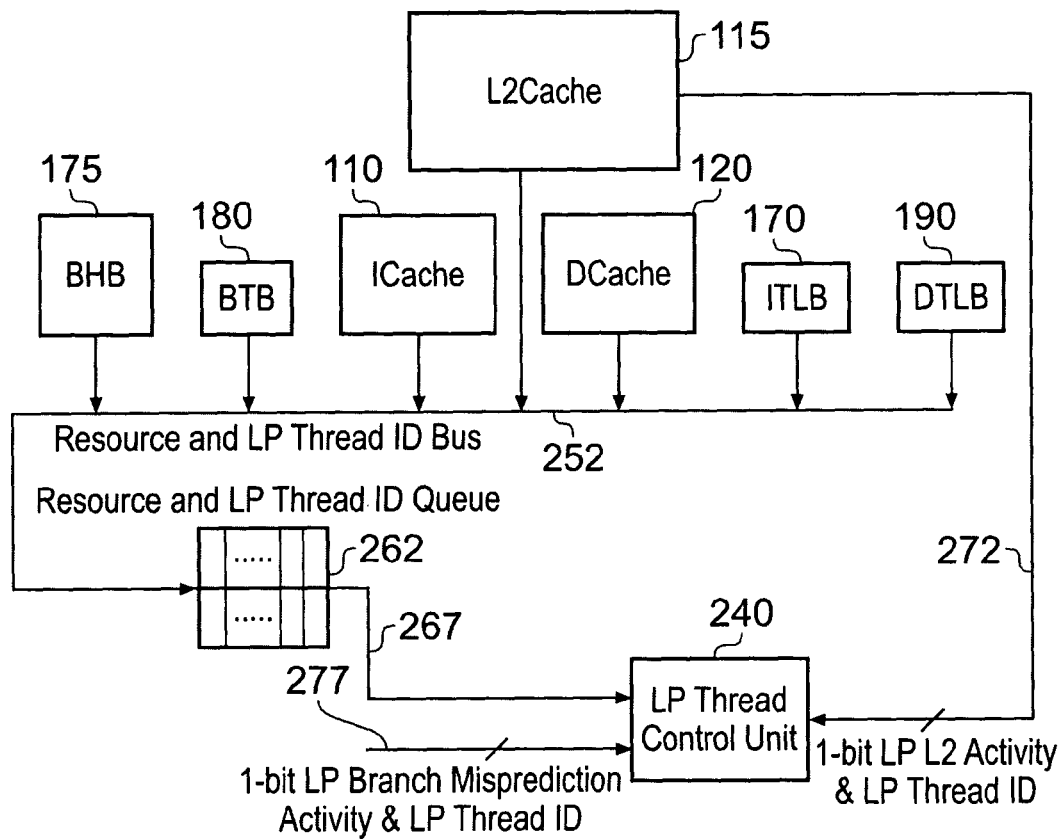
FIG. 3 illustrates the various input signals provided to the thread control unit of FIG. 1 in accordance with an alternative example embodiment.

In FIG. 2, it is assumed that at any point in time the processor core 100 is executing one high priority program thread and one low priority program thread. In an alternative embodiment, multiple low priority program threads may be executed by the processor core 100 along with the high priority program thread, and in such embodiments the input signals provided to the thread control unit 240 may take the form illustrated schematically in FIG. 3. In this example, when conflict occurs within a shared resource, that resource not only outputs its resource ID, but also outputs an ID of the low priority thread causing the conflict, this information being output onto the resource and low priority thread ID bus 252. A resource and LP thread ID queue 262 is used to temporarily buffer that information in the event that multiple conflicts in the various shared resources occur at the same time.

Similarly, over path 272 the thread control unit 240 receives an indication each time a low priority program thread accesses the level two cache, and due to the fact that there is more than one low priority program thread active at any point in time, this information also includes a low priority program thread ID identifying the particular program thread accessing the level two cache 115 at any particular instance. Similarly, the thread control unit 240 receives over path 277 an indication each time there is a branch misprediction in respect of a branch instruction executed by a low priority program thread, and this information is accompanied by an ID of the low priority program thread to which the misprediction relates.

Figure 4:
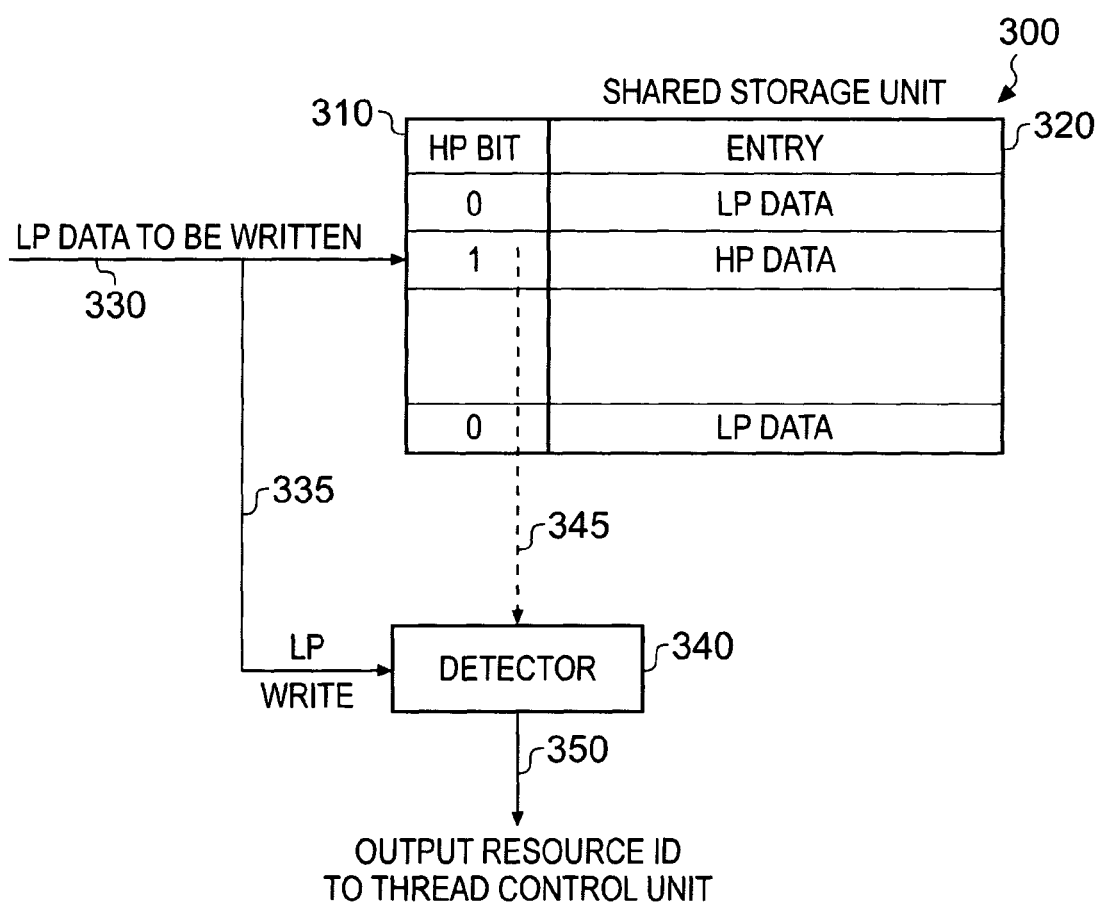
FIG. 4 illustrates the use of detector logic in one example embodiment to identify occurrences of adverse replacements in a shared storage unit.

Each of the shared resources 110, 115, 120, 170, 175, 180, 190 needs to be provided with a mechanism for detecting the occurrence of adverse replacements within that shared resource, and one such mechanism that may be used is illustrated schematically in FIG. 4. As shown in FIG. 4, in association with each entry 320 within a shared storage unit 300, a high priority (HP) bit 310 can be provided to identify whether the information stored in that entry pertains to the high priority thread or a low priority thread. Hence, in the particular example illustrated, this HP bit field will take a value of zero if the data stored in the corresponding entry pertains to a low priority thread and will take a value of one if the data in the associated entry pertains to the high priority thread. It should be noted that if the shared storage unit entries are already tagged with a thread ID, process ID, or the like, which may for instance be provided for other reasons, then this ID can be used to distinguish those entries containing information pertaining to the high priority thread from those entries containing information pertaining to a low priority thread, and accordingly a separate HP bit field 310 will not be required.

When information associated with the low priority program thread is to be written over path 330 into the shared storage unit 300, then a signal is passed over path 335 to the detect logic 340 identifying that a write operation is being performed by a low priority program thread, and identifying the entry of the shared storage unit being written to. The detector then reads over path 345 the value of the HP bit 310 associated with the relevant entry (or deduces this information from the thread or process ID information already stored in association with the entry), and if it determines that the write operation is being performed in respect of an entry that contains information pertaining to the high priority program thread, it outputs a resource ID to the thread control unit 240 via paths 250, 265 shown in FIG. 2. In the example illustrated with respect to FIG. 3, the detector will also output a thread ID for the low priority thread performing the write operation in addition to the resource ID, and this information will be routed over paths 252, 267 to the thread control unit 240.

Figure 5:
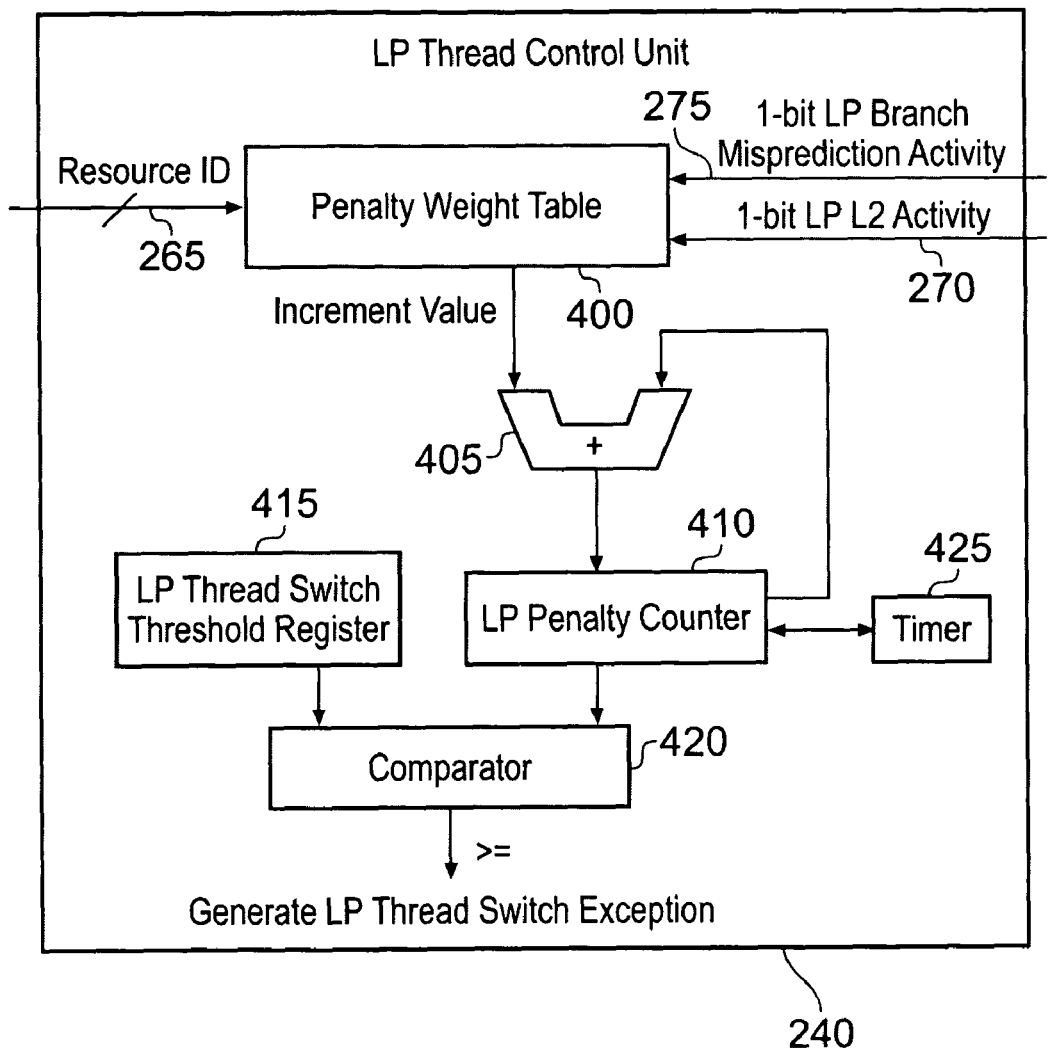
FIG. 5 is a block diagram illustrating components provided within the thread control unit of FIG. 1 in accordance with one example embodiment.

The thread control unit 240 can take a variety of forms, but in one embodiment may take the form illustrated in FIG. 5. For the purposes of FIG. 5, it is assumed that the processor core 100 will execute at any particular point in time one high priority program thread and one low priority program thread, and accordingly the input signals to the thread control unit 240 are as discussed earlier with reference to FIG. 2.

In accordance with this embodiment, each of the shared resources has a penalty weight associated therewith which is stored within the penalty weight table 400 maintained within the thread control unit 240. On receiving a particular resource ID over path 265, a lookup is performed within the penalty weight table 400 to identify the penalty weight associated with that resource, and this determines an increment value output to the adder 405, which then increments the current value stored in a penalty counter 410 by that selected increment value. Since some shared resources are more critical than other shared resources, the use of such a penalty weight table enables a different punishment weight to be associated with conflicts in different shared resources.

Purely by way of illustration, the data cache 120 may be given a higher penalty weight than the instruction cache 110, as a result of which conflicts in the data cache 120 will cause the penalty counter 410 to be incremented more rapidly than conflicts in the instruction cache 110. Similarly, the BHB 175 may be given a higher penalty weight than the BTB 180. Further, the caches may be given greater penalty weights than the BHB and BTB forming the shared branch predictor resources. However, the actual penalty weights are implementation-dependent. In one embodiment they may be determined statically and stored inside the core, whilst in an alternative embodiment, the penalty weights may be programmable, for example by the OS 200.

Similarly, penalty weights can also be associated with the energy hungry activities of the low priority program thread, in this example the low priority thread branch misprediction activities received over path 275 and the low priority thread level two access activities indicated over path 270. It will be appreciated that it is not necessary for all of the resource IDs, and all of the identified energy hungry activities, to have different penalty weights associated therewith, and indeed some of the resources and/or some of the energy hungry activities may be attributed the same penalty weight.

Each time the penalty counter 410 is incremented, the comparator 420 is used to compare the new counter value with a threshold value maintained within the low priority thread switch threshold register 415. This threshold value identifies a predetermined level above which the occurrence of the activities received over input paths 265, 270, 275 are considered to give rise to an adverse effect sufficient to warrant temporarily halting the execution of the lower priority program thread, and accordingly if the comparator determines that the penalty counter value 410 is greater than or equal to the threshold value stored in the register 415, it will issue an exception signal to the OS 200.

As will be discussed in more detail later, the OS 200 may have a number of options for dealing with the exception signal issued from the thread control unit 240, and in one embodiment the OS may choose to perform a de-allocation of the low priority program thread and an allocation of a new low priority program thread immediately, may take that action after some delayed period, or may choose to ignore the exception signal.

In one embodiment, a timer 425 is provided within the thread control unit 240 which, when the exception signal is issued, begins counting down from a specified value. If the OS 200 performs a thread switch before the timer counts down to zero, then the timer is reset and no action is taken in dependence on the timer. However, if the timer counts down to zero before the OS has performed any re-allocation, then the expiry of the timer causes the penalty counter 410 to be reset, and the processor core 100 to resume execution of the current low priority program thread.

If in contrast the OS 200 does perform a re-allocation, then the re-allocation itself will cause the penalty counter 410 to be reset so that when a new low priority program thread is allocated to the processor core 100, the penalty counter 410 starts at an initial value, typically zero.

The threshold value stored within the register 415 may be predetermined, or may be programmable. Indeed, different threshold values may be associated with different low priority program threads if desired.

Figure 6:
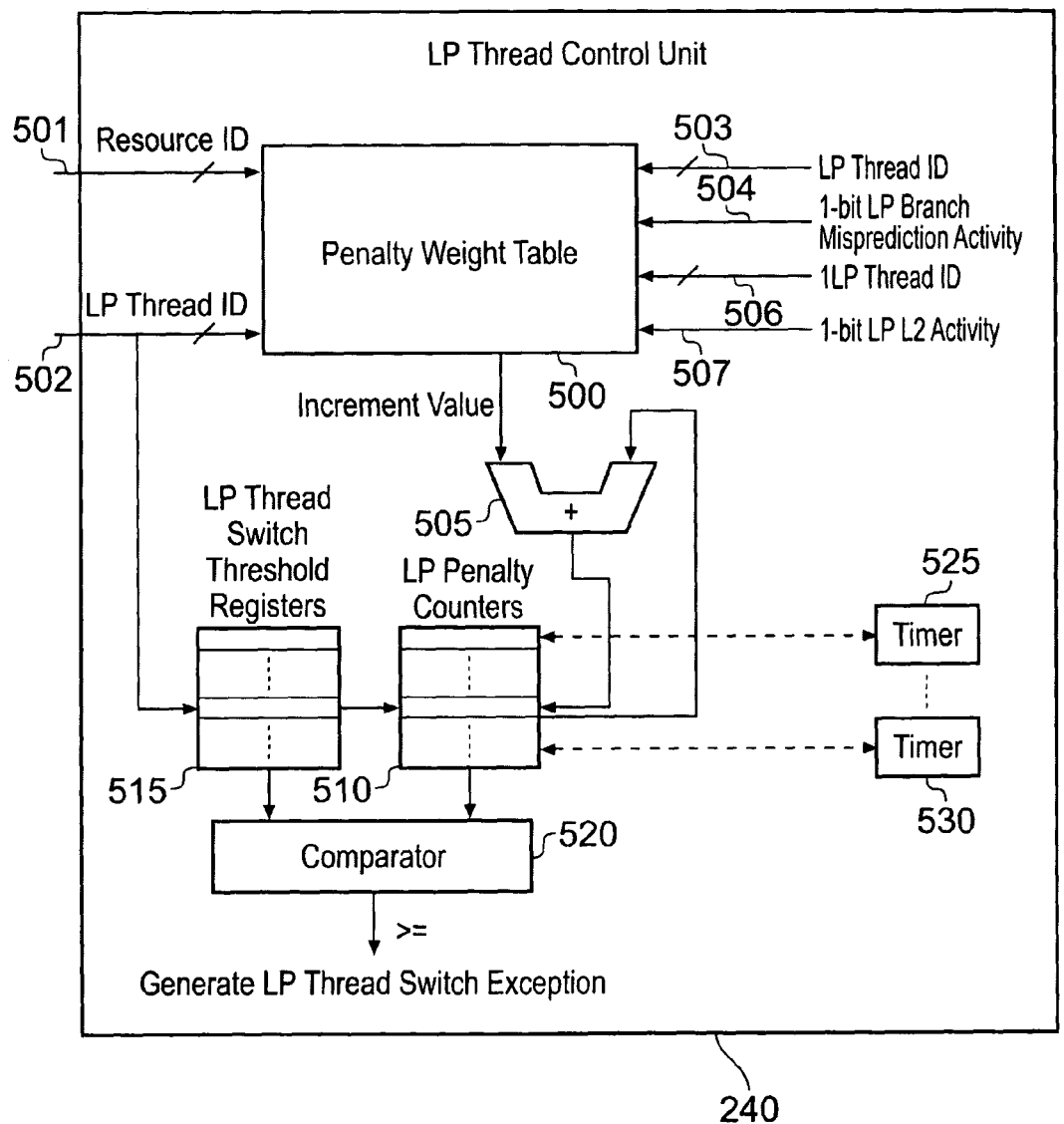
FIG. 6 is a block diagram illustrating components provided within the thread control unit of FIG. 1 in accordance with an alternative example embodiment.

FIG. 6 illustrates an alternative form of the thread control unit 240, which may be used when the processor core 100 can execute multiple low priority program threads at the same time as the high priority program thread is executing. In this example, the input signals received by the thread control unit 240 take the form illustrated earlier with reference to FIG. 3, and hence a resource ID input over path 501 is accompanied by a thread ID over path 502 identifying the low priority thread that gave rise to the conflict in that resource. Similarly, any branch misprediction activity input over path 504 is accompanied by a thread ID over path 503 identifying the low priority thread to which the misprediction relates. Similarly, any level two access activity indicated over path 507 is accompanied by a thread ID over path 506 identifying the low priority thread performing the level two access.

Separate penalty counters 510 are maintained for each currently executing low priority thread, and similarly in the embodiment illustrated separate threshold registers 515 are maintained for each currently executing low priority thread. The thread ID information associated with each input to the penalty weight table 500 is used to identify a particular counter and a particular threshold register, and then the penalty weight table is used in the same manner as discussed earlier with reference to FIG. 5 to identify an increment value to be output to the adder 505, to cause the current counter value in the identified penalty counter 510 to be incremented. Thereafter, the comparator 520 compares that newly incremented value with the threshold value in the appropriate threshold register 515, and issues an exception signal if the current counter value is greater than or equal to that threshold value.

As shown in FIG. 6, separate timers 525, 530 can be associated with each penalty counter, these timers operating in the same manner as the timer 425 described earlier with reference to FIG. 5.

Figure 7:
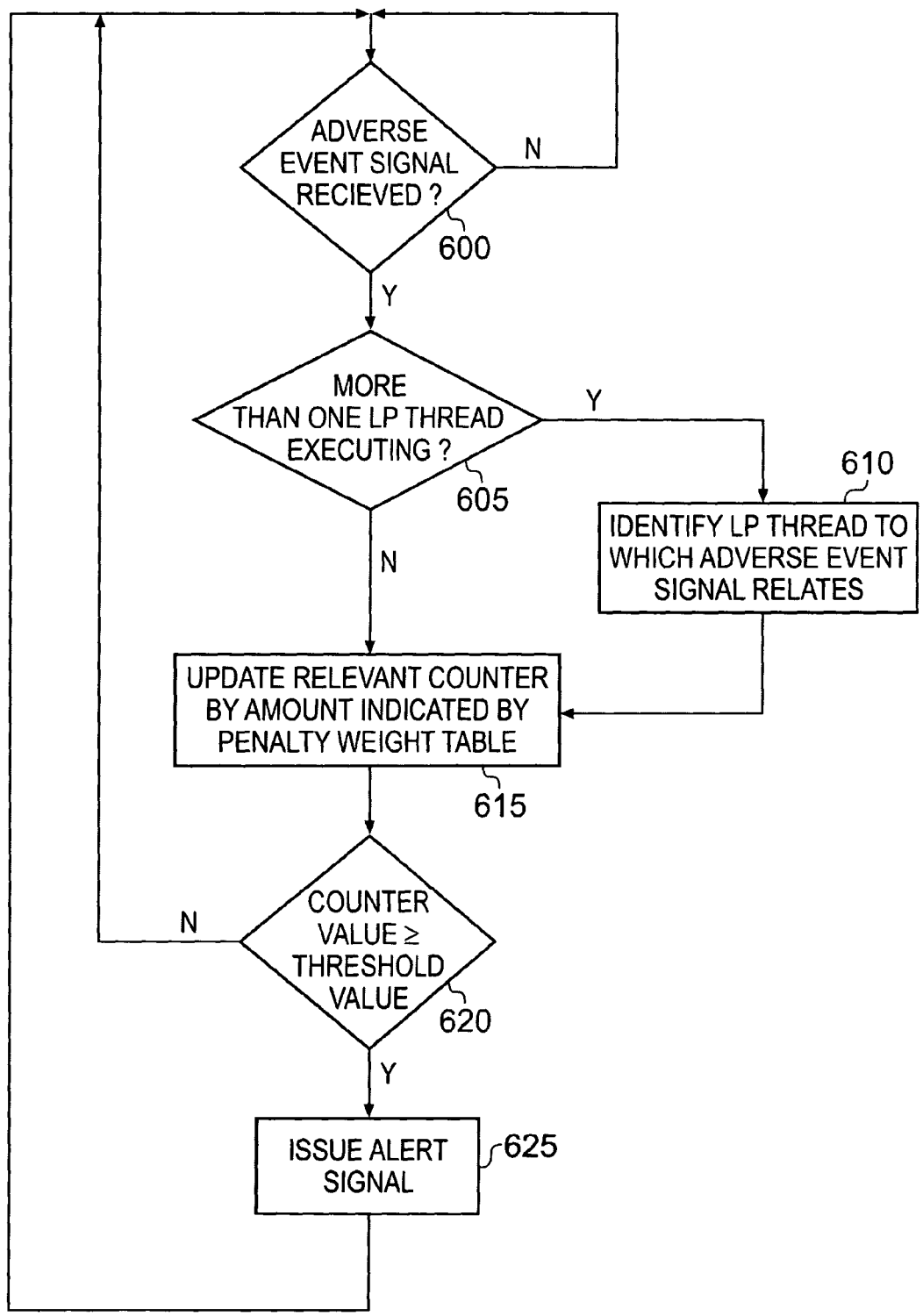
FIG. 7 is a flow diagram illustrating the operation of the thread control unit of FIG. 1 in accordance with one example embodiment.

The general operation of the thread control unit 240 is illustrated schematically in FIG. 7. At step 600, it is determined whether an adverse event signal is received, such an adverse event signal being any of the input signals to the penalty weight table. When an adverse event signal is received, it is then determined at step 605 whether there is currently more than one low priority thread executing on the processor core 100, and if so the low priority thread to which the adverse event signal relates is identified at step 610 using the thread ID information accompanying the adverse event signal. Thereafter, or if at step 605 it is determined that there is only one low priority thread executing, the process proceeds to step 615 where the relevant counter is updated by an amount indicated by the relevant entry in the penalty weight table. Thereafter, at step 620, the counter value as updated is compared with the relevant threshold value, and provided the counter value is less than the threshold value, the process returns to step 600.

However, if the counter value is determined to be greater than or equal to the threshold value, then an alert signal is issued at step 625, in the embodiments described earlier this taking the form of an exception signal. Thereafter, the process returns to step 600.

In one embodiment, the OS 200 has three options that it may take when a thread switch exception signal is issued by the thread control unit 240. Firstly, it may take the exception immediately, as a result of which the architectural state of the low priority thread has to be saved. While it is being saved, the high priority thread will not be disrupted and should be able to run alone until a new low priority thread is dispatched over path 230 from the thread recycle queue 210. When servicing the low priority thread switch exception, the OS 200 selects a new low priority thread that is waiting in the recycle queue 210 and dispatches that thread to the core.

As an alternative option, the OS 200 may delay taking the exception, due for example to a reason related to the operation of the OS 200. During this delay period, the core 100 continues to run the high priority program thread alone (or in combination with any other low priority program threads other than the low priority program thread that has given rise to the exception signal). During this time, the low priority program thread giving rise to the exception is stalled until the exception is taken by the OS.

As a third option, the exception can be ignored by the OS 200 if there are no other low priority threads awaiting allocation, i.e. the thread recycle queue 210 is empty. In this event, after a certain period of time passes as dictated by the specified values to which the relevant timer 425, 525, 530 of FIG. 5 or 6 is initialised, the low priority penalty counter 410, 510 is reset, and this triggers the processor core 100 to revive the stalled low priority program thread so that it once again runs along with the high priority program thread (and any other low priority program threads currently being executed by the processor core 100).

Thus, the low priority thread switch exception can be treated as if it occurred only in the low priority program thread, and does not affect the execution of the high priority program thread (or any other low priority program threads executing on the processor core). After the architectural state for the de-allocated low priority thread is saved, the relevant penalty counter is reset.

It should be noted that the hardware provided within the thread control unit 240 does not provide any feedback to the OS 200 as to how to select the next low priority thread, and accordingly the processor core 100 does not interfere with the decision of the OS scheduler (i.e. the OS scheduler is not changed). In fact, the OS 200 may even re-assign a low priority thread (i.e. a recycled thread) which was previously de-allocated because of its unpredictable energy hungry and/or intrusive behaviour. It is quite possible that the recycled thread may not conflict with the high priority thread when allocated again, as the previous misbehaviour may only have been temporal, and accordingly that low priority thread may no longer conflict excessively with the high priority thread.

When the OS dispatches the next low priority thread over path 230, it can also set a new threshold value by writing to the relevant thread switch threshold register 415, 515. Hence, each low priority thread may have a different threshold determined by the OS. In that embodiment, the low priority thread switch threshold register becomes an architecturally-visible register. In an alternative embodiment, the same threshold can be shared amongst all low priority threads, and in that case the low priority thread switch threshold register can be hardwired to a specific implementation-dependent value, and the only thing the OS needs to do on issuance of the low priority thread switch exception from the thread control unit 240 is to save the context of the old low priority thread and to dispatch a new one.

From the above described example embodiments, it will be appreciated that in those embodiments the processor core monitors conflicts in the shared resources caused by a low priority program thread, as well as monitoring unpredicted power-hungry operations by the low priority program thread, and collects this data in a separate unit within the core. When a certain threshold is exceeded, the core recommends to the OS via an alert signal that it de-allocate the intrusive or power-hungry low priority program thread. The OS has various options it may take upon receipt of the alert signal from the core. Whilst the OS is processing the alert signal, execution of the high priority program thread will not be stalled since the alert signal issued relates only to the low priority program thread, and hence the high priority program thread should be able to run alone while the low priority program thread context is being saved and a new low priority thread is being dispatched.

As such, example embodiments allow the high priority program thread to progress as much as possible, whilst at the same time the overall processor throughput is improved by seeking to choose co-operative low priority program threads to run along side the high priority program thread, and by also keeping the system energy under control by recycling low priority program threads that are determined to be energy hungry.

Hence, example embodiments provide improved high priority program thread performance, control system energy consumption by co-operative action between the thread control unit hardware and the operating system, and require no change in the OS thread scheduling operation. In the described embodiments, simple hardware is provided for tracking shared resource conflicts and low priority program thread energy-hungry activities.

Although example embodiments have been described herein, it will be appreciated that the claims are not limited thereto and that many modifications and additions thereto may be made within the scope of claims.

We claim:

1. A data processing apparatus comprising:
   multi-threaded processing circuitry for executing, under control of an operating system, multiple program threads including at least one high priority program thread and at least one lower priority program thread;
   at least one storage unit shared between the multiple program threads and comprising multiple entries for storing information for reference by the multi-threaded processing circuitry when executing said multiple program threads;
   thread control circuitry for detecting a condition indicating an adverse effect caused by a first lower priority program thread being executed by the multi-threaded processing circuitry and resulting from sharing of the at least one storage unit between the multiple program threads, and on detection of said condition to issue as an alert signal an exception signal to the operating system; and
   a scheduler provided by the operating system and responsive to the alert signal to cause execution of the first lower priority program thread to be temporarily halted, wherein said at least one lower priority program thread comprises said first lower priority program thread and additional lower priority program threads, and
   wherein the scheduler is configured to maintain a record of the additional lower priority program threads awaiting allocation to the multi-threaded processing circuitry and to temporarily halt execution of the first lower priority program thread by de-allocating said first lower priority program thread and allocating in its place one of the additional lower priority program threads.

2. A data processing apparatus as claimed in claim 1, wherein on de-allocating the first lower priority program thread, the scheduler places that first lower priority program thread in the record to allow subsequent reallocation of that first lower priority program thread to the multi-threaded processing circuitry.

3. A data processing apparatus as claimed in claim 1, wherein the scheduler is responsive to receipt of the alert signal to delay performing the de-allocation of the first lower priority program thread for a period of time, during that period of time the multi-threaded processing circuitry stalling execution of that first lower priority program thread.

4. A data processing apparatus as claimed in claim 1, wherein if on receipt of the alert signal the scheduler determines that there are no additional lower priority program threads awaiting allocation to the multi-threaded processing circuitry, the scheduler is arranged not to de-allocate the first lower priority program thread, and instead the multi-threaded processing circuitry stalls execution of that first lower priority program thread for a period of time, whereafter execution of that first lower priority program thread is resumed.

5. A data processing apparatus as claimed in claim 1, wherein said adverse effect is adverse energy consumption, and the condition indicating said adverse effect is occurrences of one or more predetermined energy hungry activities in respect of the at least one lower priority program thread executing on said multi-threaded processing circuitry exceeding a predetermined level, an adverse event signal being output to the thread control circuitry whenever said one or more predetermined energy hungry activities occur.

6. A data processing apparatus as claimed in claim 5, wherein one of said predetermined energy hungry activities comprises an access to one of said at least one storage units by the at least one lower priority program thread.

7. A data processing apparatus as claimed in claim 5, wherein one of said predetermined energy hungry activities comprises a branch misprediction in respect of a branch instruction executed by the at least one lower priority program thread.

8. A data processing apparatus as claimed in claim 5, wherein said adverse event signal identifies the energy hungry activity.

9. A data processing apparatus as claimed in claim 1, wherein said thread control circuitry comprises:
   an interface for receiving adverse event signals issued when events contributing to said adverse effect occur;
   a counter for maintaining a cumulative count value indicative of the received adverse event signals;
   a threshold storage for storing a threshold value indicating a predetermined level at which said condition indicating said adverse effect is detected; and
   a comparator for comparing the cumulative count value with said threshold value, and for issuing said alert signal when said condition is detected.

10. A data processing apparatus as claimed in claim 9, wherein the threshold value is programmable.

11. A data processing apparatus as claimed in claim 9, further comprising:
    a weight table for associating different weighting values with different events, such that for each received event signal indicating occurrence of an event, an amount by which the cumulative counter is increased is dependent on the weighting value associated with that event in the weight table.

12. A data processing apparatus as claimed in claim 11, wherein the weighting values are programmable.

13. A data processing apparatus as claimed in claim 9, wherein following the first lower priority program thread being temporarily halted, the counter is reset.

14. A data processing apparatus comprising:
multi-threaded processing circuitry for executing multiple program threads including at least one high priority program thread and at least one lower priority program thread;
at least one storage unit shared between the multiple program threads and comprising multiple entries for storing information for reference by the multi-threaded processing circuitry when executing said multiple program threads;
an indicator provided in association with each entry of the at least one storage unit to identify whether the information stored therein is associated with the at least one high priority program thread;
thread control circuitry for detecting a condition indicating the adverse effect caused by a first lower priority program thread being executed by the multi-threaded processing circuitry and resulting from sharing of the at least one storage unit between the multiple program threads, and on detection of said condition to issue an alert signal;
a detector, responsive to information being written into an entry of the at least one storage unit as a result of activities of the at least one lower priority program thread, to reference the indicator for that entry in order to identify whether an adverse replacement is occurring, and if so to issue an adverse event signal to the thread control circuitry; and
a scheduler responsive to the alert signal to cause execution of the first lower priority program thread to be temporarily halted,
wherein said adverse effect is an adverse impact on the performance of the at least one high priority program thread, and the condition indicating said adverse effect is an occurrence of adverse replacements in the at least one storage unit exceeding a predetermined level, an adverse replacement occurring when information associated with the at least one high priority program thread is overwritten in an entry of the at least one storage unit as a result of activities of the at least one lower priority program thread executing on said multi-threaded processing circuitry.

15. A data processing apparatus as claimed in claim 14, further comprising:
a queue for temporarily buffering one or more of said adverse event signals prior to those signals being processed by the thread control circuitry.

16. A data processing apparatus as claimed in claim 14, wherein said adverse event signal identifies the storage unit in which the adverse replacement took place.

17. A data processing apparatus comprising:
multi-threaded processing circuitry for executing multiple program threads including at least one high priority program thread and at least one lower priority program thread;
at least one storage unit shared between the multiple program threads and comprising multiple entries for storing information for reference by the multi-threaded processing circuitry when executing said multiple program threads;
thread control circuitry for detecting a condition indicating an adverse effect caused by a first lower priority program thread being executed by the multi-threaded processing circuitry and resulting from sharing of the at least one storage unit between the multiple program threads, and on detection of said condition to issue an alert signal; and
a scheduler responsive to the alert signal to cause execution of the first lower priority program thread to be temporarily halted,
wherein said adverse effect is adverse energy consumption, and the condition indicating said adverse effect is occurrences of one or more predetermined energy hungry activities in respect of the at least one lower priority program thread executing on said multi-threaded processing circuitry exceeding a predetermined level, an adverse event signal being output to the thread control circuitry whenever said one or more predetermined energy hungry activities occur;
wherein said adverse effect is an adverse impact on the performance of the at least one high priority program thread, and the condition indicating said adverse effect is an occurrence of adverse replacements in the at least one storage unit exceeding a predetermined level, an adverse replacement occurring when information associated with the at least one high priority program thread is overwritten in an entry of the at least one storage unit as a result of activities of the at least one lower priority program thread executing on said multi-threaded processing circuitry; and
wherein said adverse effect is a combination of the adverse impact on the performance of the at least one high priority program thread and adverse energy consumption, and occurrences of said adverse replacements and occurrences of said one or more predetermined energy hungry activities are taken into account by the thread control circuitry in determining whether said predetermined level has been exceeded.

18. A data processing apparatus comprising:
multi-threaded processing circuitry for executing multiple program threads including at least one high priority program thread and at least one lower priority program thread;
at least one storage unit shared between the multiple program threads and comprising multiple entries for storing information for reference by the multi-threaded processing circuitry when executing said multiple program threads;
thread control circuitry for detecting a condition indicating an adverse effect caused by a first lower priority program thread being executed by the multi-threaded processing circuitry and resulting from sharing of the at least one storage unit between the multiple program threads, and on detection of said condition to issue an alert signal; and
a scheduler responsive to the alert signal to cause execution of the first lower priority program thread to be temporarily halted;
a timer storage which is set on issuance of said alert signal to begin counting clock cycles, and is reset on allocation of one of the additional lower priority program threads;
if the timer storage counts a specified number of clock cycles without the first lower priority program thread being deallocated, the counter is reset and the multi-threaded processing circuitry is arranged to resume execution of that first lower priority program thread;

wherein said thread control circuitry comprises:
an interface for receiving adverse event signals issued when events contributing to said adverse effect occur;
a counter for maintaining a cumulative count value indicative of the received adverse event signals;
a threshold storage for storing a threshold value indicating a predetermined level at which said condition indicating said adverse effect is detected; and
a comparator for comparing the cumulative count value with said threshold value, and for issuing said alert signal when said condition is detected;
wherein said at least one lower priority program thread comprises said first lower priority program thread and additional lower priority program threads, and the scheduler maintains a record of the additional lower priority program threads awaiting allocation to the multi-threaded processing circuitry, and temporarily halts execution of the first lower priority program thread by de-allocating that first lower priority program thread and allocating in its place one of the additional lower priority program threads.

19. A data processing apparatus as claimed in claim 18, wherein the specified number of clock cycles is programmable.

20. A data processing apparatus comprising:
multi-threaded processing circuitry for executing multiple program threads including at least one high priority program thread and at least one lower priority program thread;
at least one storage unit shared between the multiple program threads and comprising multiple entries for storing information for reference by the multi-threaded processing circuitry when executing said multiple program threads;
thread control circuitry for detecting a condition indicating an adverse effect caused by a first lower priority program thread being executed by the multi-threaded processing circuitry and resulting from sharing of the at least one storage unit between the multiple program threads, and on detection of said condition to issue an alert signal; and
a scheduler responsive to the alert signal to cause execution of the first lower priority program thread to be temporarily halted;
wherein said thread control circuitry comprises:
an interface for receiving adverse event signals issued when events contributing to said adverse effect occur;
a counter for maintaining a cumulative count value indicative of the received adverse event signals;
a threshold storage for storing a threshold value indicating a predetermined level at which said condition indicating said adverse effect is detected; and
a comparator for comparing the cumulative count value with said threshold value, and for issuing said alert signal when said condition is detected;
wherein:
said multi-threaded processing circuitry executes multiple lower priority program threads;
each adverse event signal identifies the lower priority program thread that it is associated with; and
said thread control circuitry has a separate counter for each lower priority program thread, when issuing an alert signal said thread control circuitry indicating which lower priority program thread it relates to.

21. A data processing apparatus as claimed in claim 20, wherein the threshold storage stores a separate threshold value for each of the multiple lower priority program threads.

22. A method of managing multiple program threads executed, under control of an operating system, by multi-threaded processing circuitry of a data processing apparatus, the multiple program threads including at least one high priority program thread and at least one lower priority program thread, and the data processing apparatus having at least one storage unit shared between the multiple program threads and comprising multiple entries for storing information for reference by the multi-threaded processing circuitry when executing said multiple program threads, the method comprising the steps of:
detecting a condition indicating an adverse effect caused by a first lower priority program thread being executed by the multi-threaded processing circuitry and resulting from sharing of the at least one storage unit between the multiple program threads;
on detection of said condition, issuing as an alert signal an exception signal to the operating system; and
responsive to the alert signal, employing a scheduler provided by the operating system to temporarily halt execution of the first lower priority program thread,
wherein said at least one lower priority program thread comprises said first lower priority program thread and additional lower priority program threads, the method further comprising:
maintaining a record of the additional lower priority program threads awaiting allocation to the multi-threaded processing circuitry; and
temporarily halting execution of the first lower priority program thread by de-allocating said first lower priority program thread and allocating in its place one of the additional lower priority program threads.

23. A data processing apparatus comprising:
multi-threaded processing means for executing, under control of an operating system, multiple program threads including at least one high priority program thread and at least one lower priority program thread;
at least one storage means shared between the multiple program threads and comprising multiple entry means for storing information for reference by the multi-threaded processing means when executing said multiple program threads;
thread control means for detecting a condition indicating an adverse effect caused by a first lower priority program thread being executed by the multi-threaded processing means and resulting from sharing of the at least one storage means between the multiple program threads, and on detection of said condition for issuing as an alert signal an exception signal to the operating system; and
scheduler means provided by the operating system, responsive to the alert signal, for causing execution of the first lower priority program thread to be temporarily halted,
wherein said at least one lower priority program thread comprises said first lower priority program thread and additional lower priority program threads, and
wherein the scheduler means is configured to maintain a record of the additional lower priority program threads awaiting allocation to the multi-threaded processing circuitry means and temporarily halt execution of the first lower priority program thread by de-allocating said first lower priority program thread and allocating in its place one of the additional lower priority program threads.

\* \* \* \* \*